US006473968B1

(12) United States Patent
Mastrofrancesco et al.

(10) Patent No.: US 6,473,968 B1
(45) Date of Patent: Nov. 5, 2002

(54) TELESCOPING JOINT ASSEMBLY AND A METHOD FOR MAKING THE SAME

(75) Inventors: Luigi Mastrofrancesco, Northville, MI (US); Alan C. Johnston, Rochester Hills, MI (US)

(73) Assignee: Ford Global Tech., Inc., Dearborn, MI (US)

( * ) Notice: Subject to any disclaimer, the term of this patent is extended or adjusted under 35 U.S.C. 154(b) by 0 days.

(21) Appl. No.: 09/443,222

(22) Filed: Nov. 18, 1999

(51) Int. Cl.[7] .......... B21D 39/04

(52) U.S. Cl. .......... 29/898.03; 29/458; 29/897.2; 29/722

(58) Field of Search .......... 29/898.03, 898.07, 29/898.12, 898.15, 434, 458, 897.2, 722; 464/162; 74/492; 416/144; 405/297; 427/253

(56) References Cited

U.S. PATENT DOCUMENTS

| | | | | |
|---|---|---|---|---|
| 2,697,645 A | | 12/1954 | Mitchell | |
| 4,033,020 A | | 7/1977 | Hudgens | |
| 4,563,912 A | | 1/1986 | Parks | |
| 5,042,153 A | * | 8/1991 | Imao et al. | 29/898.12 |
| 5,114,521 A | | 5/1992 | Isegawa et al. | |
| 5,243,874 A | | 9/1993 | Wolfe et al. | |
| 5,490,322 A | * | 2/1996 | Goodwater et al. | 29/722 |
| 5,640,884 A | * | 6/1997 | Fujiu et al. | 74/492 |
| 5,720,102 A | * | 2/1998 | McClanahan | 29/898.12 |
| 5,722,300 A | * | 3/1998 | Burkhard et al. | 74/492 |
| 6,223,619 B1 | * | 5/2001 | Shibata et al. | 464/162 |

FOREIGN PATENT DOCUMENTS

| | | | | |
|---|---|---|---|---|
| EP | 0927620 A1 | | 7/1999 | |
| JP | 01055411 A | | 8/1987 | |
| JP | 02307710 A | * | 12/1990 | B29C/39/10 |

* cited by examiner

*Primary Examiner*—Anthony Knight
*Assistant Examiner*—Doug Hutton
(74) *Attorney, Agent, or Firm*—Ford Global Tech, Inc.

(57) ABSTRACT

A telescoping joint assembly and a method for making a telescope joint assembly 10. The joint assembly 10 has a pair of members 12, 14 which are telescopically engaged. Assembly 10 further includes a resinous, plastic and/or polymer material 16 which shrinkably coats or lines the inner shaft 12 after the inner shaft 12 is heated and exposed to a substantially inert gas, thereby providing a relatively durable and substantially "low friction" bearing or surface 18 which is effective to promote and/or assist the telescopic sliding motion between the members 12, 14.

10 Claims, 6 Drawing Sheets

10
12
30
20
50
50
32
34
14
52
16
52
56

TELESCOPING JOINT ASSEMBLY AND A METHOD FOR MAKING THE SAME

FIELD OF THE INVENTION

This invention relates to a joint assembly and a method for making a joint assembly, and more particularly to a telescoping joint assembly and a method for making a telescoping joint assembly having a pair of members which telescopingly cooperate to form a relatively tight and reliable joint.

BACKGROUND OF THE INVENTION

Automotive vehicles and other types of assemblies often utilize telescoping type joints and/or joint assemblies to operatively couple selectively rotatable shafts or members in a manner which allows torque or rotational energy to be communicated and/or transmitted by and between the coupled members, while concomitantly allowing the coupled members to independently move axially with respect to each other (e.g., to selectively move "toward and away" from each other).

For example and without limitation, a vehicle steering system or assembly generally includes a steering shaft or column and a telescoping intermediate shaft which is coupled to and transfers torque between a steering column and a steering gear assembly. Particularly, the rotational energy of the steering column is transferred through the telescoping intermediate shaft to the gear assembly and the wheel suspension assembly, thereby allowing the vehicle to be selectively steered.

Typically, the intermediate shaft comprises and/or includes an inner shaft or member and an outer shaft or member which movably and selectively receives and/or "mates" with the inner shaft or member and which cooperates with the inner member to allow the steering column and gear shaft to be "axially compliant" (i.e., to selectively and independently move "toward and away" from each other).

In order to substantially reduce friction and improve the performance, compliance, and efficiency of this intermediate shaft and/or steering shaft assembly (as well as other types of joint assemblies), the inner member is typically coated or lined with a resin, rubber or polymer material, or contains a bearing assembly. The telescoping intermediate shaft compensates for the relative movement between the vehicle body and vehicle frame which occurs as the car is driven and allows at least one of the coupled members, such as the steering column, to substantially and desirably "collapse" in the event of a collision or accident, thereby substantially reducing the probability of injury to the driver. The telescoping shaft may further allow the steering column to be adjusted by the driver in an axial or telescopic manner.

Although this intermediate shaft, as well as other substantially similar types of prior joint assemblies, effectively transmit torque between a pair of coupled members or shafts while concomitantly allowing the coupled members to be axially compliant, they suffer from some drawbacks.

For example and without limitation, these prior joint assemblies are typically relatively loose fitting and do not have a relatively precise fit or "correspondence" between the telescoping members and/or between one or more of the telescoping members and the liner or bearing assembly. Particularly, because the members and the liner/bearing assembly are each formed by separate and independent processes, the manufacturing "tolerance" associated with each of the members and the liner/bearing assembly are additively accumulated or "stacked", thereby resulting in a relatively "loose" overall tolerance and a relatively imprecise or relatively loose fit. As a result, these prior telescoping joint assemblies suffer from undesirable "slop", "lash", vibration, frictional loss, and/or "frictional lock-up", which require relatively costly and complicated modifications.

Particularly, these undesirable attributes hinder and/or undesirably diminish the sliding engagement between the telescoping members, resulting in an inefficient transmission of torque or rotational energy while concomitantly creating excessive wear and fatigue to and of the telescoping members, thereby causing failure and/or diminished performance (e.g., undesirably allowing vibrational forces and/or other movements/forces to be readily transferred between the coupled components and/or members, such as between the wheel suspension assembly and the steering column).

Efforts to improve these relatively loose joints typically include but are not limited to relatively costly sizing, adjusting, or machining of the respective shafts. Furthermore, in order to obtain a more precise tolerance or fit between the inner and outer members, the members must typically undergo relatively complex and undesirable machining processes after they have been formed and/or after a lining has been applied to the inner and/or outer member. This "post-fabrication" machining undesirably increases the expense, time, and difficulty of the manufacturing process.

There is therefore a need to provide a telescoping joint assembly for coupling two members or shafts which overcomes at least some of the various and previously delineated drawbacks of prior coupling assemblies; which allows torque and rotational energy to be relatively efficiently transmitted between the two coupled members or shafts, while concomitantly allowing each of the members or shafts to be axially compliant; which provides for a substantially "tight" fit between the telescoping members; which substantially eliminates and/or reduces "slop", lash, frictional loss, and/or "frictional lock-up"; and which substantially eliminates the need for post-fabrication "machining" of the telescoping members.

SUMMARY OF THE INVENTION

It is a first object of the invention to provide a telescoping joint assembly and a method for making a telescoping joint assembly which overcomes some or all of the previously delineated drawbacks of prior telescoping joint assemblies.

It is a second object of the invention to provide a telescoping joint assembly which selectively allows torque and/or rotational energy to be transmitted and/or communicated between two telescoping members, while concomitantly allowing the telescoping members to selectively, independently, and reciprocally move toward and away from each other.

It is a third object of the present invention to provide a telescoping joint assembly which provides for substantially "tight" or precise dimensional fit or correspondence between two operatively assembled telescoping members.

It is a fourth object of the present invention to provide a telescoping joint assembly which substantially eliminates and/or reduces "slop", "lash", frictional losses and/or "frictional lock-up", and which substantially eliminates and/or reduces the amount of vibrational forces transferred between the coupled members.

According to a first aspect of the present invention, a telescoping joint assembly is provided. The telescoping joint assembly includes a first member having an inner cavity; a second member which is selectively and movably disposed within the cavity and which cooperates with the first member to form a gap; a certain amount of a thermoplastic material which is disposed within the gap and which selectively shrinks and solidifies, thereby bonding to the second member and allowing the second member to be slidably disposed within the cavity.

According to a second aspect of the present invention a method for making a telescoping joint assembly is provided. The method includes the steps of providing a first member having a cavity of a first shape; providing a second member adapted to be inserted within the cavity; placing an amount of thermoplastic material within the cavity; heating the cavity effective to liquefy the thermoplastic material; heating the second member; inserting the heated second member within the cavity, effective to cause the thermoplastic material to be distributed within the cavity and around the second member; cooling the first member effective to solidify the material, thereby bonding the material onto the second member and creating a telescoping joint assembly.

These and other objects, aspects, features, and advantages of the present invention will become apparent from a consideration of the following specification and the attached drawings.

DETAILED DESCRIPTION OF THE PREFERRED EMBODIMENT OF THE INVENTION

Figure 1:
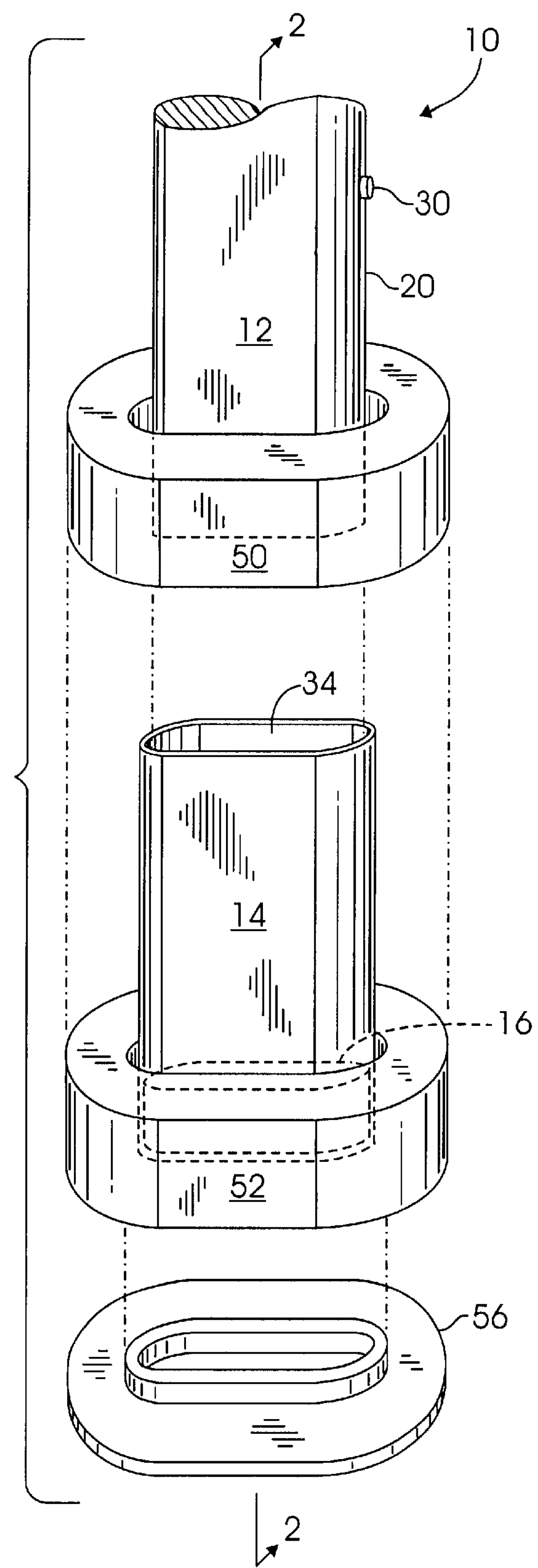
FIG. 1 is a perspective unassembled view of a joint assembly which is made in accordance with the teachings of the preferred embodiment of the invention.

Referring now to FIGS. 1–6, there is shown a telescoping joint assembly 10, which is made in accordance with the teachings of the preferred embodiment of the invention. The joint assembly 10 includes an inner shaft or member 12 which is adapted to be selectively, operatively and slidably inserted into and to selectively engage a generally hollow or tubular outer shaft or member 14. Assembly 10 further includes a resinous, plastic or polymer material 16 which is inserted into member 14 and which, as explained more fully below, coats or lines the inner shaft 12, thereby providing a relatively durable and low friction bearing or surface 18 which is effective to promote and/or assist the telescopic sliding motion between the members 12, 14 in manner which is more fully delineated below.

Figure 4:
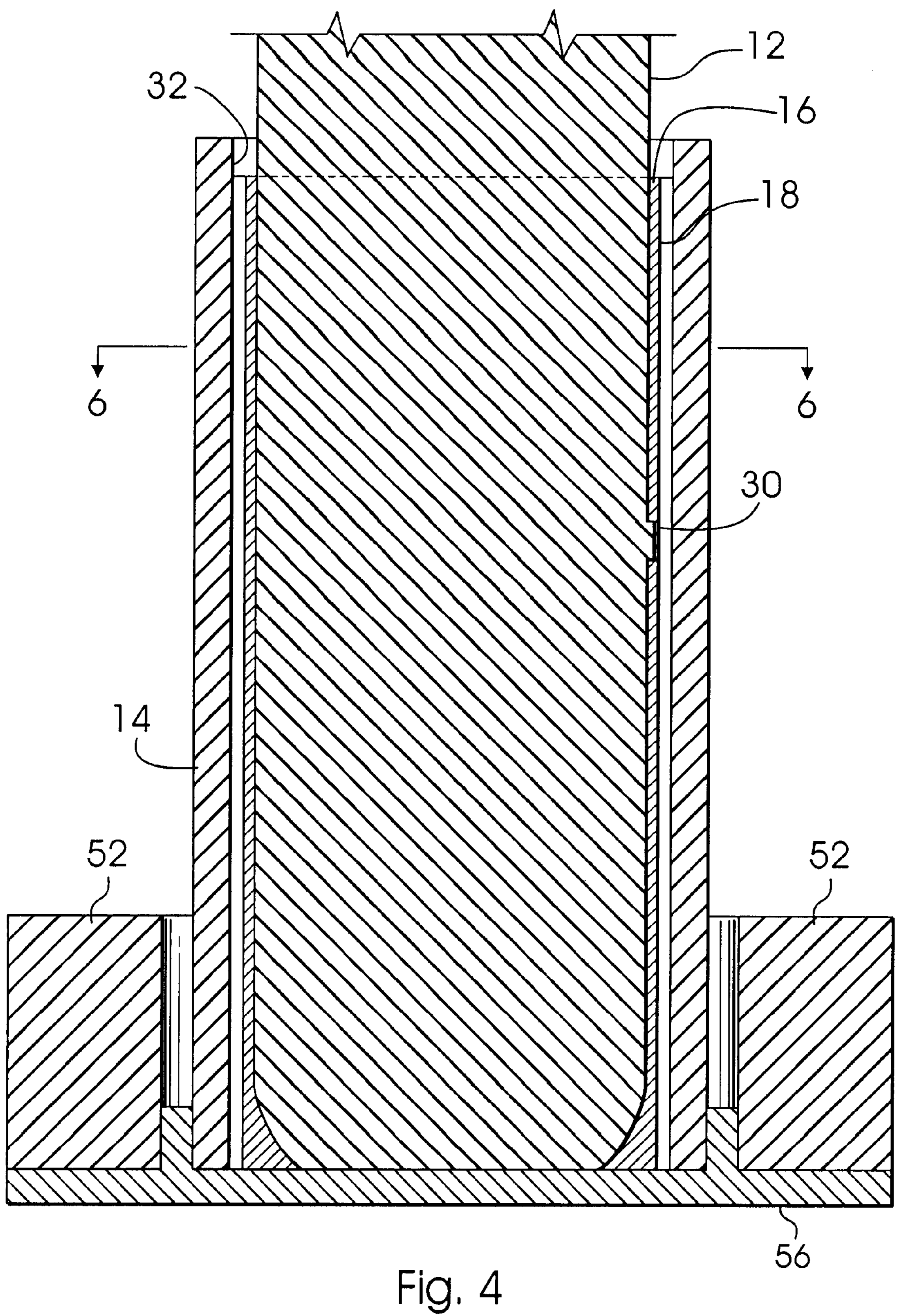
FIG. 4 is an enlarged cross sectional view of the joint assembly which is shown in FIG. 1, which is taken along the view line 2—2, and which is shown in a fabricated state.
Figure 5:
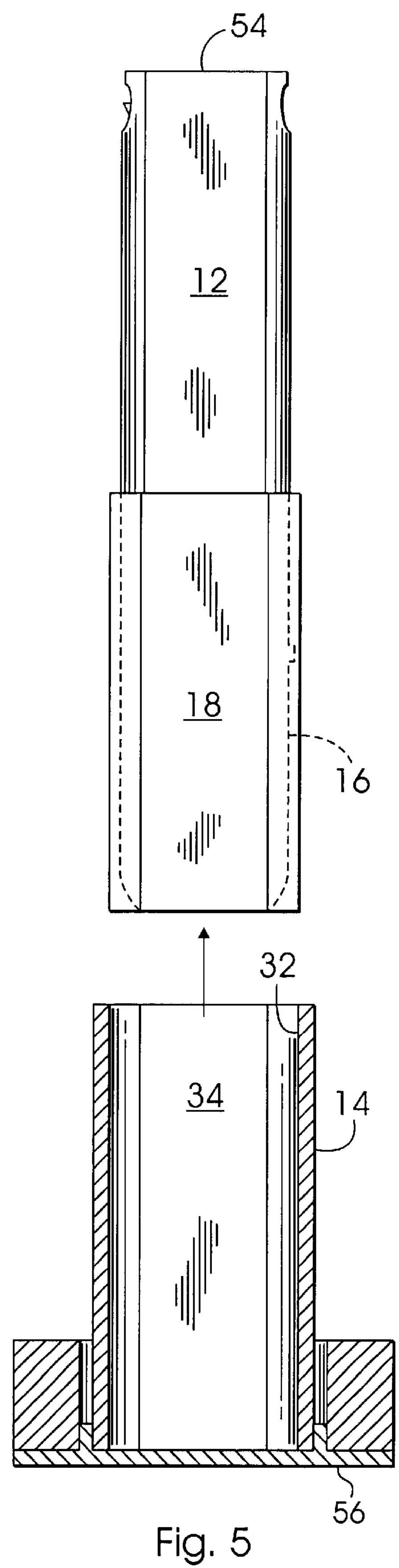
FIG. 5 is a partial cross sectional view of the joint assembly which is shown in FIG. 1, which is taken along the view line 2—2, and which is shown in a fabricated and unassembled state.
Figure 6:
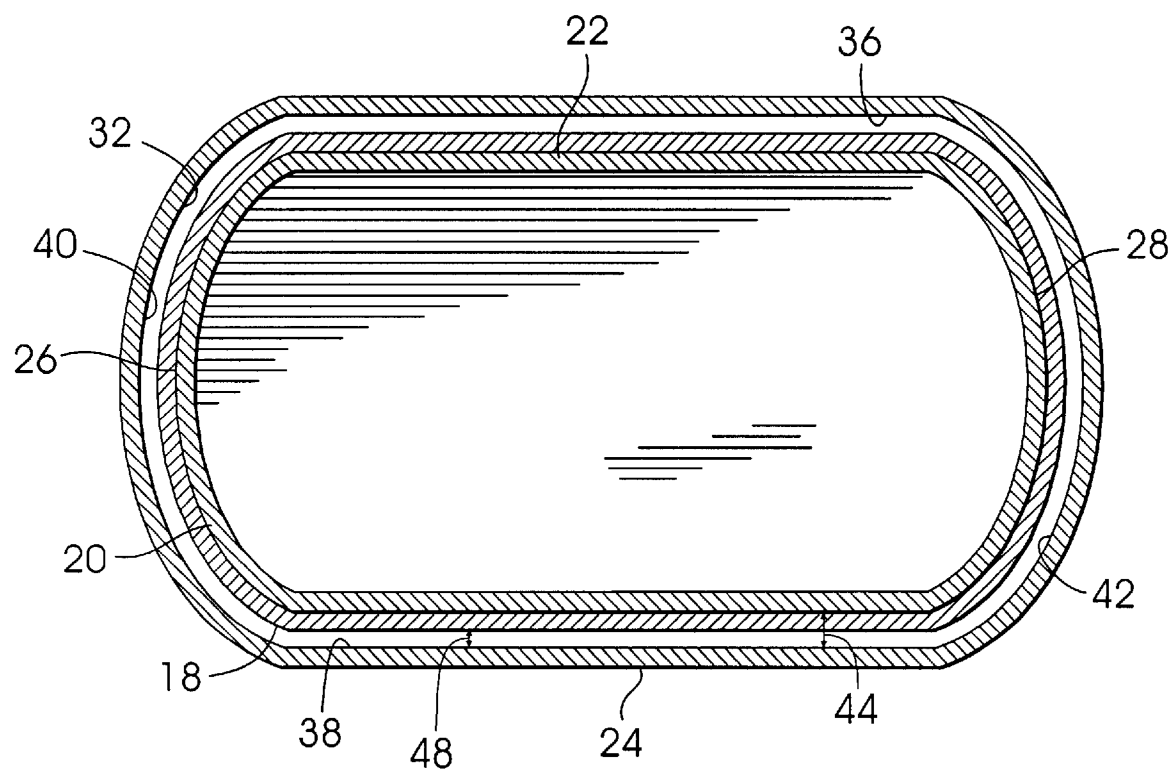
FIG. 6 is an enlarged cross sectional view of the joint assembly which is shown in FIG. 4, which is taken along view line 6—6, and which is shown in an assembled state.

In the preferred embodiment of the invention, member 12 includes an outer surface 20, which is coated, lined or covered by material 16, as best shown in FIGS. 4–6. Particularly, as best shown in FIG. 6, surface 20 has a generally oblong cross sectional shape which is cooperatively formed by two opposing substantially flat surface portions 22, 24 which are integrally formed with and which terminate upon opposed generally convex and semi-circular surface portions 26, 28. Surface 20 includes a knurled or raised projection, protuberance, or formation 30 which protrudes and/or outwardly projects from surface 20 and which, as described more fully and completely below, is adapted to selectively engage the solidified material 16, thereby securing the material to member 12. In other alternate embodiments, projection 30 comprises one or more indentations, grooves or openings disposed upon and/or within surface 20 and which are each effective to "hold" or secure at least a portion of the solidified material 16 onto surface 20, thereby securing at least a portion of the solidified material 16 to member 12.

Member 14 further includes and/or forms a cavity 34 which is bounded by and/or is defined by an inner surface 32. Cavity 34 has a generally oblong cross sectional shape which is substantially and integrally formed by two opposing substantially flat surface portions 36, 38 which are integrally formed with and which terminate upon two opposed, concave, and semi-circular surface portions 40, 42. As shown, surface 20 and surface 32 have substantially similar and corresponding shapes with the exception that surface 32 is relatively larger in size and/or surface area than surface 20. Hence, when inner member 12 is inserted into cavity 34, a substantially uniform distance or gap 44 is formed between surface 20 and surface 32. In one non-limiting embodiment, the distance or gap 44 between surfaces 20 and 32 (i.e., between each of surfaces 22–28 and the respective and opposing surfaces 36–42) is substantially uniform. In alternate embodiments, surfaces 20 and 32 each include a plurality of conventional and corresponding "splines" which are circumferentially formed upon the respective surfaces 20, 32 and which are adapted to selectively and cooperatively intermesh.

As best shown in FIGS. 4 through 6, material 16 substantially and uniformly coats or lines the portion of member 12 which telescopically penetrates cavity 34 and/or engages member 14. Material 16 is resinous and/or polymeric in nature and, in one non-limiting embodiment of the invention, comprises thermoplastic material such as acetal, 6:6 nylon material. As discussed more fully and completely below, once assembly 10 is fully assembled and/or formed, material 16 substantially and uniformly occupies or resides within gap 44. The outer surface 18 of the solidified material 16 is substantially similar in shape to surfaces 20 and 32 with the exception that surface 18 is relatively larger in size and/or has a relatively larger surface area than does surface 20 and is relatively smaller in size and/or has a relatively smaller surface area than does surface 32. Hence, a substantially uniform distance or gap 48 is formed between surfaces 18 and 32. The gap 48 between surfaces 18 and 32 is relatively small, thereby providing a considerably precise fit between the engaging portions of members 12 and 14. In one non-limiting embodiment, the distance or gap 48 between surfaces 18 and 32 is substantially uniform and equal to about 0.03 inches. This relatively minute gap 48 substantially prevents members 12 and 14 from independently rotating with respect to each other, thereby allowing joint assembly 10 to effectively transmit torque between the selectively coupled members 12 and 14. This relatively small distance 48 and precise "dimensional fit" between material 16 and outer member 14 further substantially eliminates "lash" and vibration and improves the overall operational "smoothness" of assembly 10.

This relatively minute gap or distance 48 is created through the novel method of assembling and/or fabricating joint assembly 10. As best shown in FIGS. 1–5, assembly 10 is assembled and/or fabricated as follows.

Member 14 is initially inserted into a fixture 56, which secures member 14 in a substantially "upright" position. Cavity 34 is then filled or "flooded" with an inert gas (e.g., the air and/or other gasses resident within cavity 34 are forcibly and intentionally replaced with an inert gas). In another non-limiting embodiment, member 12 and 14 may also be immersed within the inert gas or the gas filled cavity 34. In the preferred embodiment of the invention the inert gas comprises argon gas, although other inert gasses may be utilized. The presence of the inert gas within cavity 34 substantially prevents the metal of members 12, 14 from oxidizing, and further substantially prevents degradation of material 16. In other alternate embodiments, the entire assembly and/or fabrication process is performed within an inert gas environment, thereby causing substantially the entire surface 32 of member 12 and surface 20 of member 14 to be selectively exposed to the inert gas. Members 12 and 14 are then each respectively heated by the use of conventional heat induction coils 50, 52. Particularly, members 12, 14 are heated until they reach a predetermined temperature which is substantially greater than the melting point of material 16.

Figure 2:
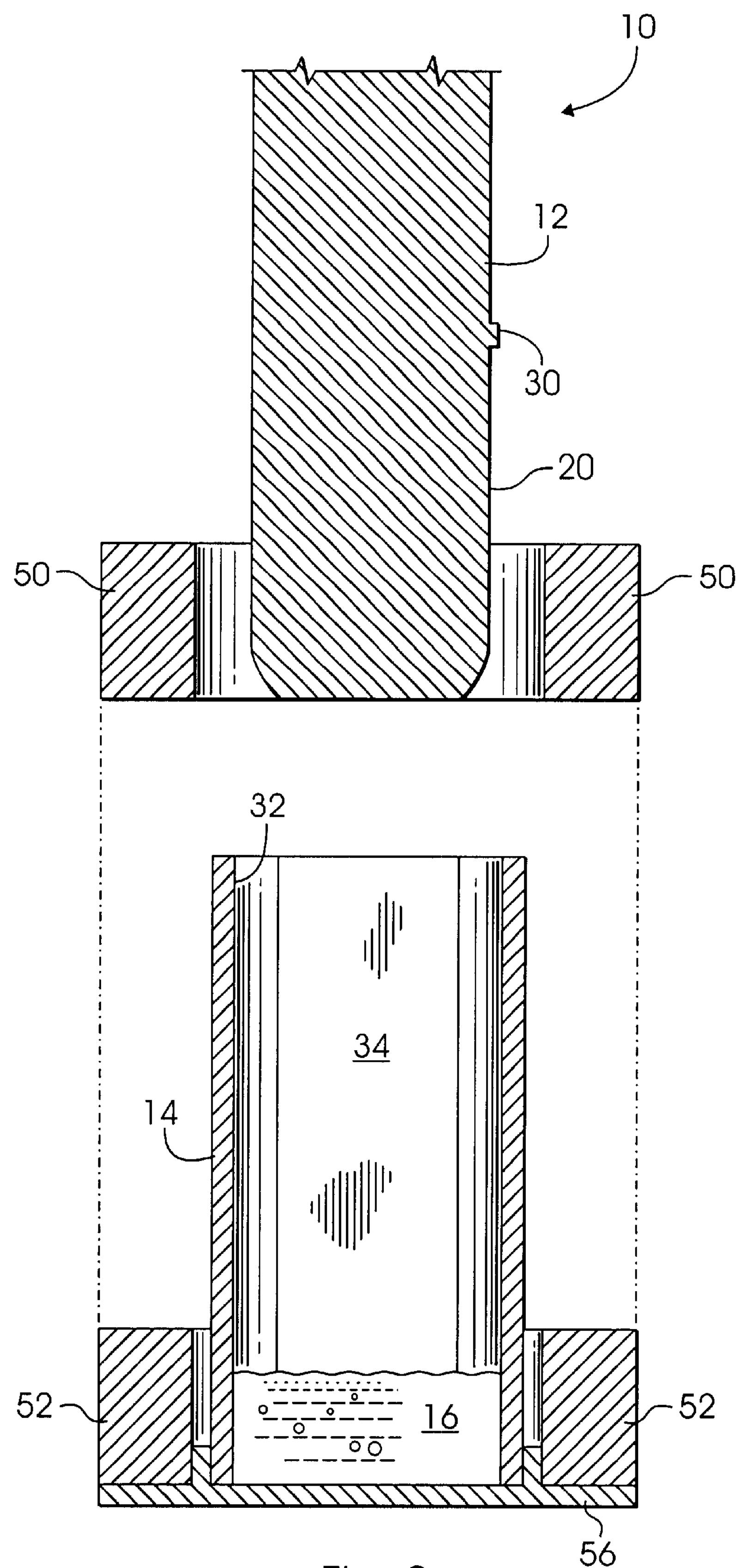
FIG. 2 is a cross sectional view of the joint assembly which is shown in FIG. 1 and which is taken along view line 2—2.
Figure 3:
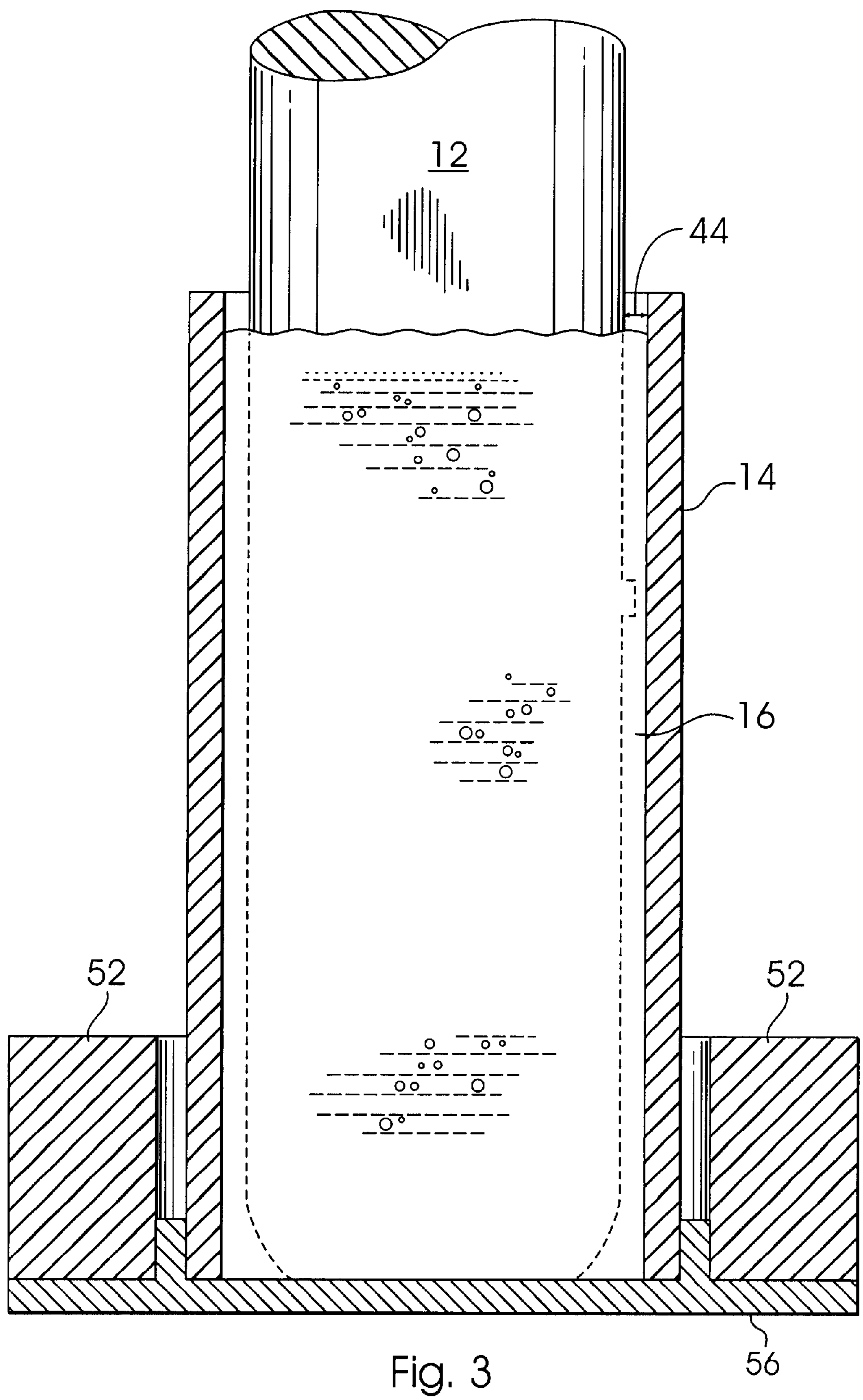
FIG. 3 is an enlarged cross sectional view of the joint assembly which is shown in FIG. 1, which is taken along the view line 2—2, and which is shown in a partially fabricated state.

After cavity 34 is filled with the inert gas and the members 12, 14 are heated, a predetermined amount of material 16 is placed within cavity 34, as best shown in FIG. 2. In the preferred embodiment of the invention, material 16 is melted or liquefied prior to its insertion within cavity 34. However, it should be appreciated that material 16 may be placed within cavity 34 in a substantial "solid form" or "solid state" and subsequently melted within the cavity 34 by the use of heat induction from coil 52 and member 14. Member 12 is then gradually inserted into cavity 34.

Since the temperature of members 12, 14 is above the melting point of the material 16, as member 12 is inserted into cavity 34, material 16 remains in its liquid or molten state and is displaced around the outer surface of member 12 as the member 12 is inserted into cavity 34. Particularly, as shown best in FIG. 3, when member 12 is fully inserted into cavity 34, material 16 substantially fills the gap 44 formed between the outer surface 20 of member 12 and the inner surface 32 of member 14.

Once member 12 has been fully inserted into cavity 34, the liquefied material 16 is substantially and evenly distributed between surfaces 20 and 32. The heat provided by coil 52 is then selectively removed or "lowered", thereby allowing heat to dissipate from assembly 10 and reducing the temperature of members 12, 14 and material 16. As the temperature of material 16 decreases, the material 16 begins to solidify and/or harden. The solidification of material 16 causes the material 16 to shrink or decrease in size by a predetermined and relatively highly predictable amount, and further causes the material 16 to bond or attach to member 12. As the material 16 solidifies, the relatively small, uniform and precise gap 48 is formed, thereby providing a highly precise mating between members 12 and 14. It should be appreciated that by casting material 16 within the engaged members 12, 14, the gap 48 is determined solely by the relatively highly predictable, uniform and controlled shrinkage of material 16. As such, the present invention substantially avoids the "tolerance stacking" associated with prior art telescoping joint assemblies.

Once material 16 has solidified, projection 30 secures material 16 to member 12. After material 16 has solidified and cooled, member 12 is removed from cavity 34 and a conventional and commercially available lubricant, such as grease or oil, may be selectively applied to the outer surface 18 of solidified material 16 and/or to the inner surface 32 of member 14 in order to reduce sliding type friction between the engaged members 12, 14.

In one non-limiting embodiment, joint assembly 10 replaces the traditional and previously delineated telescoping intermediate and/or steering shaft which is resident within a vehicle steering assembly. In this configuration, end 54 of member 12 is operatively attached to the vehicle steering column in a conventional manner and end 56 of member 14 is operatively attached to the vehicle gear shaft or gearbox in a conventional manner. In this manner, the selective torque or rotational energy, which is generated by the steering column, is transferred and/or communicated through assembly 10 to the gear shaft in a manner which allows the gear shaft to concomitantly and axially articulate toward and away from the steering column.

Particularly, as forces and/or vibrations are imparted upon assembly 10, by way of the typical wheel suspension assembly, member 12 selectively, telescopically, and movably penetrates member 14 and cavity 34, thereby substantially eliminating the relative torsional motion between member 12 and member 14, and substantially preventing such movement, vibration, lash, or slop from being communicated to the steering column. The axial movement provided by assembly 10 also allows the steering column to desirably "collapse" in the event of a collision or accident and/or to be selectively adjusted in a telescoping manner or motion.

Importantly, the relatively tightly fitted telescoping members 12 and 14 allow the steering column and the gear shaft to smoothly and consistently articulate, with respect to each other, and substantially reduces and/or eliminates "slop", "lash", vibration, frictional losses and/or "frictional lock-up" associated with the relatively "loose" tolerances of prior telescoping intermediate shafts and/or steering shaft assemblies.

It should be appreciated that the assembly 10 may be selectively used within various other applications requiring the coupling of two axially compliant members and the transmission or resistance of torque and/or rotational energy by and between these coupled members. It should further be appreciated that while a pair of shaft type members 12, 14 are shown, assembly 10, as well as the various other coupling assemblies described herein, is adapted to couple other types, shapes, and/or forms or members and to provide the described coupling benefits and/or attributes to these other coupling arrangements.

It is understood that the invention is not limited by the exact construction or method illustrated and described above but that various changes and/or modifications may be made without departing from the spirit and/or the scope of Applicants' inventions.

What is claimed is:

1. A method for manufacturing a telescoping joint assembly, said method comprising the steps of:

providing a first member having a cavity of a first shape;

injecting an amount of inert gas into said cavity which is only sufficient to substantially fill said cavity;

providing a second member;

heating said first member;

placing an amount of liquefied thermosetting material within said cavity;

heating said second member;

inserting said heated second member within said cavity to cause said liquefied thermosetting material to be distributed within said cavity and around said second member; and cooling said first member effective to solidify said material and to shrink said material, thereby bonding said material onto said second member.

2. The method of claim 1 further comprising the step of disposing a knurl upon said second member, said knurl being effective to secure said solidified material upon said second member.

3. The method of claim 1 further comprising the step of creating an indentation within said second member, said indentation being effective to secure said solidified material upon said second member.

4. The method of claim 1 further comprising the step of applying a lubricant to said solidified material.

5. The method of claim 1 wherein said inert gas comprises argon.

6. A method for manufacturing a telescoping joint assembly, said method comprising the steps of:

providing a first member having an oblong cavity;

providing a second member having a shape corresponding to said oblong cavity;

injecting an amount of inert gas into said oblong cavity which is only sufficient to substantially fill said oblong cavity;

heating said first member;

placing an amount of liquefied thermosetting material within said cavity;

heating said second member;

inserting said heated second member within said cavity to cause said liquefied thermosetting material to distributed within said cavity and around said second member; and cooling said first ember effective to solidify said material and to shrink said material, thereby bonding said material onto said second member.

7. The method of claim 6 further comprising the step of knurling a portion of said second member, said knurled portion being effective to secure said solidified material upon said second member.

8. The method of claim 6 further comprising the step of creating an indentation within said second member, said indentation being effective to secure said solidified material upon said second member.

9. The method of claim 6 further comprising the step of applying a lubricant to said solidified material.

10. The method of claim 6 wherein said inert gas comprises argon.

* * * * *